United States Patent
Yamasaki (10) Patent No.: US 7,179,075 B2
(45) Date of Patent: Feb. 20, 2007

(54) VERTICAL INJECTION MOLDING MACHINE

(75) Inventor: Hiromasa Yamasaki, Akashi (JP)

(73) Assignee: Toyo Machinery & Metal Co., Ltd., Hyogo (JP)

( * ) Notice: Subject to any disclaimer, the term of this patent is extended or adjusted under 35 U.S.C. 154(b) by 105 days.

(21) Appl. No.: 11/106,478

(22) Filed: Apr. 15, 2005

(65) Prior Publication Data

US 2006/0159800 A1    Jul. 20, 2006

(30) Foreign Application Priority Data

Jan. 20, 2005    (JP) .............................. 2005-013057

(51) Int. Cl.
*B29C 45/84* (2006.01)

(52) U.S. Cl. ...................... 425/169; 425/136; 425/154; 425/593

(58) Field of Classification Search ................ 425/136, 425/137, 154, 169, 593, 451.6
See application file for complete search history.

(56) References Cited

U.S. PATENT DOCUMENTS

| | | | | |
|---|---|---|---|---|
| 4,755,124 A * | 7/1988 | Tanaka et al. | ............... | 425/593 |
| 5,393,210 A * | 2/1995 | Kasai et al. | ................ | 425/145 |
| 5,800,750 A * | 9/1998 | Laing et al. | ................ | 425/136 |
| 5,851,699 A * | 12/1998 | Matsubayashi et al. | ..... | 425/593 |
| 7,041,242 B2 * | 5/2006 | Hakoda et al. | ............. | 425/154 |

* cited by examiner

*Primary Examiner*—James P. Mackey
(74) *Attorney, Agent, or Firm*—Crowell & Moring LLP (57) ABSTRACT

A vertical injection molding machine designed to move up/down a large weight by a toggle link mechanism so as to perform mold opening/closing. In a foreign matter detection region where a mold opening/closing servo-motor is subjected to speed feedback control during a mold closing process, a measured torque value of the mold opening/closing servo-motor is compared with a standard torque characteristic curve with no foreign matter between dies. Between a start position of the foreign matter detection region and a position of the foreign matter detection region in which a torque value is zero in the standard torque characteristic curve, it is concluded that there is a foreign matter between the dies when the measured torque is lower than the standard torque characteristic curve by a predetermined value or more. Between the position of the foreign matter detection region in which a torque value is zero in the standard torque characteristic curve and an end position of the foreign matter detection region, it is concluded that there is a foreign matter between the dies when the measured torque is higher than the standard torque characteristic curve by a predetermined value or more. The foreign matter between the dies can be detected surely without provision of any weight compensating mechanism.

4 Claims, 4 Drawing Sheets

VERTICAL INJECTION MOLDING MACHINE

FIELD OF THE INVENTION

The present invention relates to a vertical injection molding machine in which dies are opened/closed in an up/down direction, and particularly relates to a technique about detection of a foreign matter between dies in an ending period of a mold closing process in a vertical injection molding machine in which a plurality of massive members are moved up/down by a toggle link mechanism so as to open/close the dies. For the sake of convenience of description, the mold closing process herein designates a process from the completion of mold opening to mold touch. A process for fully stretching the toggle link mechanism to thereby provide a predetermined mold clamping force after the mold closing process is defined as a mold clamping process.

DESCRIPTION OF THE BACKGROUND ART

A known vertical injection molding machine has a configuration as follows. That is, a tail stock mounted with a mold opening/closing servo-motor is disposed under a fixed die plate having a fixed-side die disposed on the upper surface side thereof. A movable die plate is disposed above the fixed die plate. A movable-side die is disposed on the lower surface side of the movable die plate while an injection unit is mounted and carried on the upper surface side of the movable die plate. The tail stock, the movable die plate, the injection unit, etc. are moved down or up with respect to the fixed die plate by a toggle link mechanism driven to be stretched or folded by a driving force of the mold opening/closing servo-motor. The vertical injection molding machine configured thus can be designed to rotate the fixed-side die having a mold release surface on the top. For example, when two fixed-side dies are provided to be paired, the vertical injection molding machine can be made excellent in mass productivity for insert molding or the like.

However, in the vertical injection molding machine configured thus, massive members such as the tail stock, the movable die plate, the injection unit, etc. are moved up/down integrally by the toggle link mechanism so that such a large weight is applied to the toggle link mechanism. Therefore, there is a problem that it is difficult to detect a foreign matter in the ending period of a mold closing process where the toggle link mechanism is stretched. The detection should be performed for protecting the dies. To this end, in order to diminish the aforementioned large weight, there has been proposed a vertical injection molding machine in which a weight compensation mechanism and a spring are used together to compensate the weight (as disclosed in Japanese Patent Laid-Open No. 2000-263610) or a vertical injection molding machine in which only a spring member is used to compensate the weight (as disclosed in Japanese Patent Laid-Open No. 113964/1998).

However, the technique disclosed in Japanese Patent Laid-Open No. 2000-263610 or Japanese Patent Laid-Open No. 113964/1998 requires an additional mechanism for compensating the weight. Accordingly, there is a problem that the machine cost is increased correspondingly to increase in number of parts. Further, according to the configuration using a spring for compensating the weight, the spring is apt to be damaged due to recurring stress so that the spring must be frequently replaced.

SUMMARY OF THE INVENTION

The present invention was developed in consideration of the foregoing problems. It is an object of the present invention to make it possible to surely detect a foreign matter between dies without provision of any mechanism for compensating a large weight in a vertical injection molding machine in which the large weight is moved up/down by a toggle link mechanism so as to open/close the dies.

In order to attain the foregoing object, according to the present invention, there is provided a vertical injection molding machine including: a tail stock mounted with a mold opening/closing servo-motor; a movable die plate having a movable-side die disposed on a lower surface side thereof; a tie bar for tying the tail stock to the movable die plate; a fixed die plate disposed between the tail stock and the movable die plate and having a fixed-side die disposed on an upper surface side thereof; a ball screw mechanism for converting rotation of the mold opening/closing servo-motor into a rectilinear motion; a toggle link mechanism linked with an upper surface side of the tail stock and a lower surface side of the fixed die plate and driven to be stretched/folded by a rectilinear motion of a rectilinear movement member of the ball screw mechanism, the toggle link mechanism being driven to be stretched through the ball screw mechanism by the mold opening/closing servo-motor in a mold opening state so as to move down the tail stock to thereby move down the tie bar and the movable die plate together with the tail stock to thereby perform mold closing; and a foreign matter determination unit for comparing a measured torque value of the mold opening/closing servo-motor with a standard torque characteristic curve in a state where there is no foreign matter between the dies, in a foreign matter detection region where the mold opening/closing servo-motor is subjected to speed feedback control along a position axis in a mold closing process, so as to determine whether there is a foreign matter between the dies or not, the foreign matter determination unit changing over a criterion for determining whether there is a foreign matter or not, in the boundary of a torque value 0 in the standard torque characteristic curve; wherein:

between a start position of the foreign matter detection region and a position of the foreign matter detection region where a torque value is zero in the standard torque characteristic curve, the foreign matter determination unit concludes that there is a foreign matter between the dies when the measured torque is lower in absolute value than the standard torque characteristic curve corresponding to torque in a direction supporting weight upward (torque in a mold opening direction) by a predetermined value or more; and between the position of the foreign matter detection region where a torque value is zero in the standard torque characteristic curve and an end position of the foreign matter detection region, the foreign matter determination unit concludes that there is a foreign matter between the dies when the measured torque is higher in absolute value than the standard torque characteristic curve corresponding to torque in a mold closing direction by a predetermined value or more.

As a result of various experiments, the present inventor has found out the following fact. That is, a toggle link mechanism is driven to be stretched through a ball screw mechanism by a mold opening/closing servo-motor subjected to speed feedback control, so as to move down a tail stock to thereby move down a tie bar, a movable die plate and an injection unit together with the tail stock. Thus, mold closing is performed. In such a configuration, due to such a large weight, a static balance is taken between the weight and the toggle link mechanism receiving the weight before mold touch, that is, before the toggle link mechanism is fully stretched. Thus, the measured output torque of the mold opening/closing servo-motor turns 0 (zero). In other words, the present inventor has found out that even if the toggle link mechanism is not fully stretched (the toggle link mechanism is not fully stretched to stabilize itself due to its own dynamic characteristic) when driving of the mold opening/closing servo-motor is stopped, a large weight can have an influence such that a static balance is secured between the large weight and the toggle link mechanism receiving the large weight before mold tough (not to say, before the end of mold closing resulting in mold touch), and this state can be maintained. That is, assume that a measured torque value of the mold opening/closing servo-motor controlled to be driven by speed feedback control along a position axis is detected and plotted in a foreign matter detection region in a mold closing process when there is no foreign matter between dies. In this case, the measured torque value behaves as follows. That is, between a start position of the foreign matter detection region and a position of the foreign matter detection region where the aforementioned static balance is taken before the mold touch, the measured torque value shows a torque value in a direction supporting the weight upward (a torque value in a mold opening direction), while the absolute value of the torque value is decreased gradually toward 0 (zero). In the position where the static balance is taken before the mold touch, the measured torque value turns 0. Further, between the position where the static balance is taken before the mold touch and an end position of the foreign matter detection region (in the state of mold touch where mold closing has been completed, and where the toggle link mechanism has not yet been fully stretched), the measured torque value shows a torque value in a mold closing direction (that is, the torque direction is changed over to a direction reverse to the torque direction kept till then), while the measured torque value is increased from 0 in a negative direction (that is, the absolute value of the torque in a direction reverse to the direction supporting the weight upward is increased).

The present invention was developed based on such finding. In a foreign matter detection region in a mold closing process, a measured torque value of a mold opening/closing servo-motor controlled to be driven by speed feedback control along a position axis is detected in each position. As for each position, the measured torque value is compared with a standard torque characteristic curve in a state where there is no foreign matter between dies. Between a start position of the foreign matter detection region and a position of the foreign matter detection region where a torque value is zero in the standard torque characteristic curve (a position where a static balance is taken before mold touch though a toggle link mechanism is not fully stretched, as described above), it is concluded that there is a foreign matter between the dies when the measured torque is lower in absolute value than the standard torque characteristic curve by a predetermined value or more. Between the position of the foreign matter detection region where a torque value is zero in the standard torque characteristic curve and an end position of the foreign matter detection region, it is concluded that there is a foreign matter between the dies when the measured torque is higher in absolute value than the standard torque characteristic curve by a predetermined value or more. This reason will be described below. Assume that there is a foreign matter between the dies in the period between the start position of the foreign matter detection region and a position of the foreign matter detection region where a torque value is zero in the standard torque characteristic curve. In this case, the foreign matter receives the gravity and acts to reduce the absolute value of the motor torque (the torque value in the direction supporting the weight upward). Therefore, based on the aforementioned criterion, it is determined whether there is a foreign matter or not. Assume that there is a foreign matter between the dies in the period between the position where a torque value is zero in the standard torque characteristic curve and the end position of the foreign matter detection region. In this case, the absolute value of the motor torque (which is reverse to the torque in the direction supporting the weight upward) increases to overcome the foreign matter. Therefore, the criterion is changed over to another one as described above, and it is determined by the other criterion whether there is a foreign matter or not.

According to the present invention, using such a foreign matter detection method, it is possible to surely detect a foreign matter between the dies without provision of any weight compensation mechanism as in the background art.

DESCRIPTION OF THE PREFERRED EMBODIMENT

Figure 1:
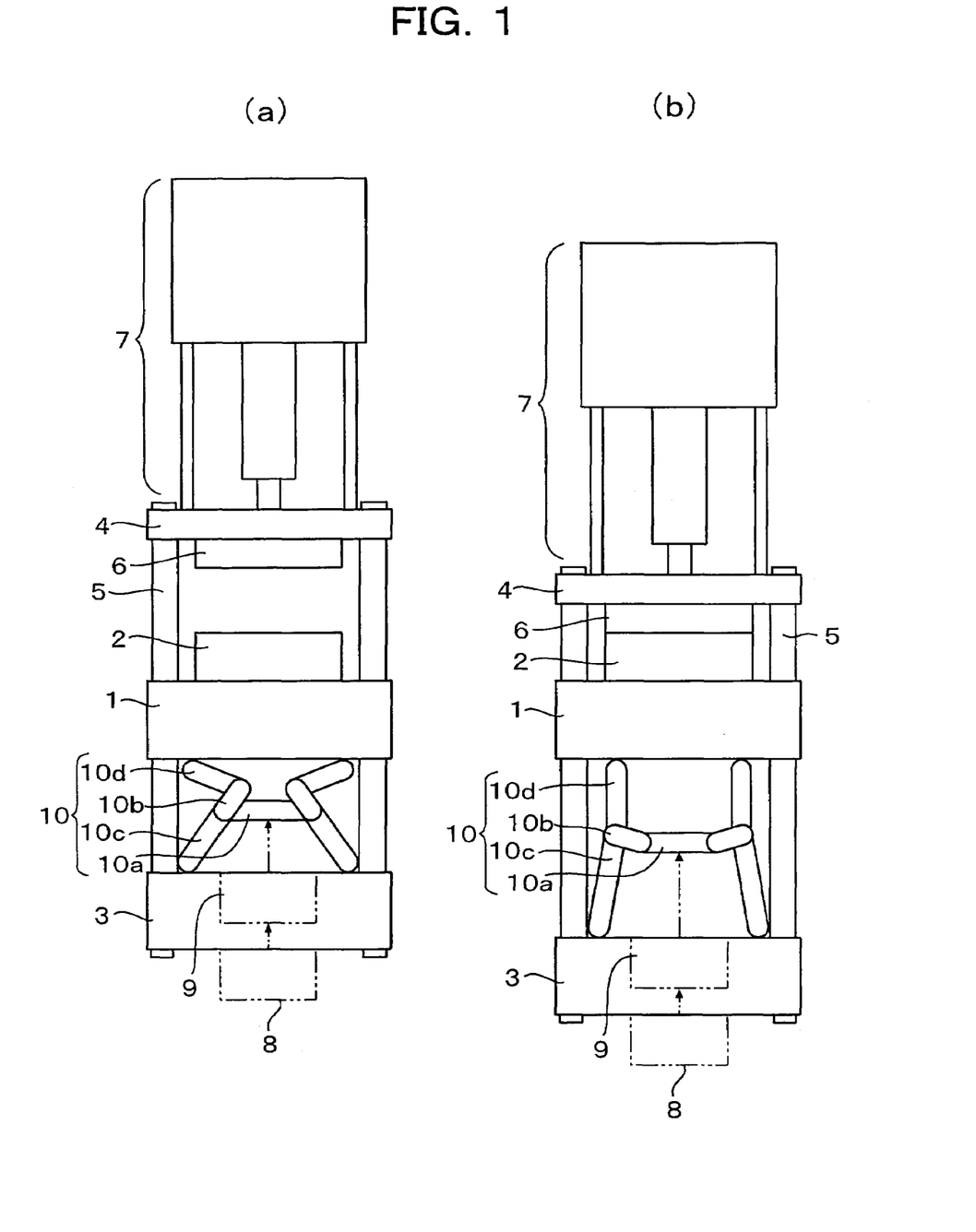
FIGS. 1A–1B are explanatory diagrams showing the outline of a mechanism of a vertical injection molding machine according to an embodiment of the present invention.

An embodiment of the present invention will be described below with reference to the drawings. FIGS. 1A and 1B are diagrams showing the outline of a mechanism of a vertical injection molding machine according to an embodiment of the present invention (hereinafter referred to as "this embodiment"). FIG. 1A shows a state where mold opening is completed, and FIG. 1B shows a state where mold closing is completed.

In FIGS. 1A–1B, the reference numeral 1 represents a fixed die plate fixed to a not-shown retention block; 2, a fixed-side die attached directly to the upper surface side of the fixed die plate 1 or disposed on the upper surface side of the fixed die plate 1 indirectly through a not-shown rotary table (or positioned and disposed on the upper surface side of the fixed die plate 1 through a not-shown rotary table); 3, a tail stock disposed under the fixed die plate 1 movably up/down; 4, a movable die plate disposed above the fixed die plate 1 movably up/down; 5, a tie bar fixed to the tail stock 3 and the movable die plate 4 at its opposite ends and for tying the tail stock 3 to the movable die plate 4; 6, a movable-side die attached to the lower surface side of the movable die plate; 7, an injection unit mounted and carried on the upper side of the movable die plate 4; 8, a mold opening/closing servo-motor mounted on the tail stock 3; 9, a ball screw mechanism having a nut portion retained rotatably on the tail stock 3 and a screw shaft screwed down to the nut portion movably rectilinearly, and for converting rotation of the mold opening/closing servo-motor 8 into a rectilinear motion; 10, a toggle link mechanism linked with the upper surface side of the tail stock 3 and the lower surface side of the fixed die plate 1 and driven to be stretched/folded by the rectilinear motion of the screw shaft of the ball screw mechanism 9; 10a, a cross head serving as a force input terminal of the toggle link mechanism 10, to which the front end of the screw shaft of the ball screw mechanism 9 is fixed and linked; 10b, a first link whose one end is rotatably linked with the cross head 10a; 10c, a second link whose one end is rotatably linked with the upper surface side of the tail stock 3 while the other end is rotatably linked with the other end of the first link 10b; and 10d, a third link whose one end is rotatably linked with the lower surface side of the fixed die plate 1 while the other end is rotatably linked with the other end of the first link 10b.

When the fixed-side die 2 is positioned and disposed on the upper surface side of the fixed die plate 1 through a not-shown rotary table, two fixed-side dies 2 having one and the same shape may be fixedly disposed at an interval of 180° on the not-shown rotary table. In addition, in this case, the tie bar 5 is designed to have a structure of three tie bars. The rotary table is made rotatable around one of the tie bars, while the rotary table is positioned and locked whenever it rotates 180°. In this positioned state, the fixed-side die 2 is designed to be just opposed to the movable-side die 6. In such a manner, the vertical injection molding machine according to the present invention can be designed so that the fixed-side dies 2 are positioned and disposed on the upper surface side of the fixed die plate 1 through a not-shown rotary table. However, such a configuration is not directly involved in the gist of the present invention. Therefore, for the sake of simplification of the description, the following description will be made on the assumption that the fixed-side die 2 is attached directly to the upper surface side of the fixed die plate 1.

In the configuration shown in FIGS. 1A–1B, in a mold closing process, the mold opening/closing servo-motor 8 is driven to rotate in a predetermined direction in a state where mold opening is completed as shown in FIG. 1A. As a result, the toggle link mechanism 10 is driven to stretch through the ball screw mechanism 9. Due to the stretching action of the toggle link mechanism 10, the tail stock 3 is driven to move down with respect to the fixed die plate 1. Thus, the die bar 5, the movable die plate 4, the movable-side die 6, the injection unit 7, etc. are driven to move down integrally with the tail stock 3. In this event, driving of the servo-motor 8 is controlled by speed feedback control along a position axis (for example, along a moving stroke of the cross head 10a or along a moving stroke of the movable die plate 4 calculated from the toggle characteristic based on the moving stroke of the cross head 10a). In an ending period of the mold closing process (for example, between a position 50 mm short of mold touch and a position of the mold touch (termination of mold closing)), driving of the servo-motor 8 is controlled by speed feedback control at a speed low enough to detect whether there is a foreign matter between the dies as will be described later. Then, when the movable-side die 6 moving down touches the fixed-side die 2, the mold closing process is terminated. At the time when the mold closing process is terminated, the toggle link mechanism 10 has not yet been stretched fully. A mold clamping process is initiated immediately after the mold closing process is completed. Till the toggle link mechanism 10 is fully stretched, the servo-motor 8 is further driven to rotate in the same direction. When the toggle link mechanism 10 is fully stretched, the tie bar 5 is elastically stretched. Due to a restoring force of the tie bar 5 against its stretching, a predetermined mold clamping force is generated. In this state, the mold clamping process is terminated. Incidentally, in the mold clamping process, driving of the servo-motor 8 is controlled by pressure feedback control along a position axis or a time axis so as to output a large torque.

In the aforementioned mold clamping state, molten resin injected from the injection unit 7 is charged into a cavity formed by the fixed-side die 2 and the movable-side die 6. A mold opening process is carried out in the state where the resin in the mold has been solidified. In the mold opening process, the mold opening/closing servo-motor 8 is driven to rotate in a direction reverse to the direction in the mold closing process. As a result, the toggle link mechanism 10 is driven to be folded through the ball screw mechanism 9 so that the tail stock 3 is driven to move up with respect to the fixed die plate 1. Thus, the tie bar 5, the movable die plate 4, the movable-side die 6, the injection unit 7, etc. are driven to move up integrally with the tail stock 3.

In this embodiment, in the aforementioned mold closing process, the toggle link mechanism 10 is driven to stretch through the ball screw mechanism 9 by the mold opening/closing servo-motor 8 subjected to speed feedback control, so that the tie bar 5, the movable die plate 4, the movable-side die 6, the injection unit 7, etc. are moved down together with the tail stock 3. When mold closing is performed thus, due to such a large weight, a static balance is taken between the large weight and the toggle link mechanism 10 receiving the large weight before mold touch and before the toggle link mechanism 10 is fully stretched. Thus, there is a phenomenon that the measured output torque of the servo-motor 8 turns 0 (zero) before the mold touch.

Figure 2:
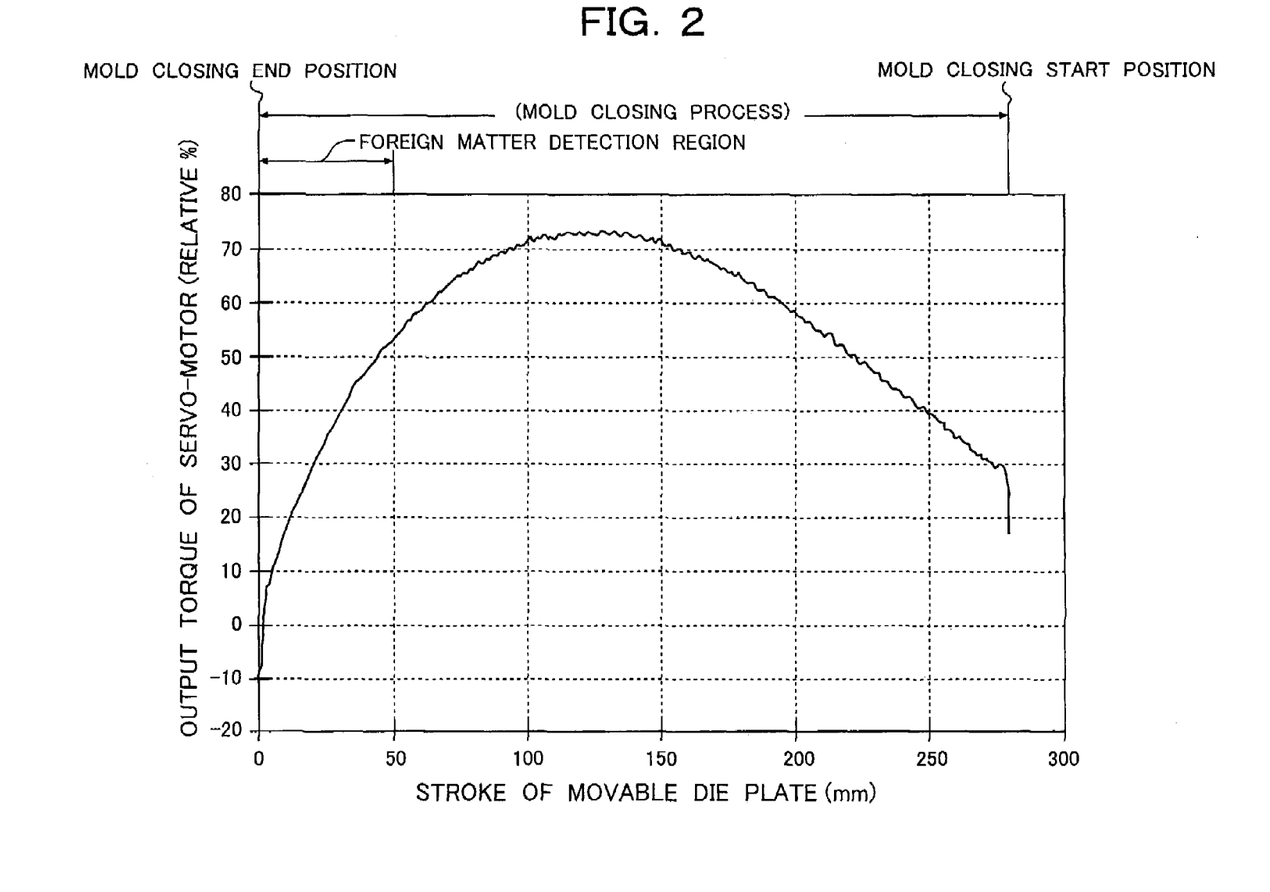
FIG. 2 is an explanatory diagram showing the relationship between a stroke (moving distance) of a movable die plate and a measured output torque of a mold opening/closing servo-motor during a mold closing process in the vertical injection molding machine according to the embodiment of the present invention.

FIG. 2 is a diagram showing the relationship between a stroke (moving distance) of the movable die plate 4 and a measured output torque of the mold opening/closing servo-motor 8 during the mold closing process in the vertical injection molding machine according to this embodiment. FIG. 2 shows data with no foreign matter between the dies. In FIG. 2, the abscissa designates the stroke of the movable die plate 4 by mm. The mold closing process starts in a mold closing start position, proceeds in a direction to reduce the numeric value of the stroke, and terminates in a mold closing end position where the numeric value of the stroke is 0. On the other hand, the ordinate in FIG. 2 designates the measured torque value (the measured value of output torque obtained by calculation using a detected current value) of the mold opening/closing servo-motor 8 by relative %. As shown in FIG. 2, when mold closing is performed by controlling the driving of the mold opening/closing servo-motor 8 by speed feedback control along a position axis, the measured torque value of the mold opening/closing servo-motor 8 turns zero before mold touch (about 2 mm short of mold touch in FIG. 2) and before the toggle link mechanism 10 is fully stretched. Accordingly, in this position about 2 mm short of mold touch, a static balance can be taken between a large weight and the toggle link mechanism receiving the large weight even if the toggle link mechanism 10 has not been fully stretched when the driving of the mold opening/closing servo-motor 8 is stopped. This state can be kept without any driving force of the servo-motor 8. When mold closing is performed by the servo-motor 8 subjected to speed feedback control, the large weight acts to stretch the toggle link mechanism 10 before the position where the aforementioned static balance is taken. Therefore, the servo-motor 8 is operated by speed feedback control to prevent the large weight from dropping suddenly due to its own weight. Thus, the measured torque value of the servo-motor 8 takes a torque value (a positive-side value in the graph of FIG. 2) in a direction (a mold opening direction) supporting the weight upward before the position where the aforementioned static balance is taken. On and after the position where the aforementioned static balance is taken, the direction of the torque is changed over so that the measured torque value takes a torque value (a negative-side value in the graph of FIG. 2) in a direction (a mold closing direction) reverse to the direction supporting the weight upward, while the measured torque value goes beyond zero toward the negative side so that the absolute value thereof is increased to further stretch the toggle link mechanism 10.

That is, assume that a measured torque value of the mold opening/closing servo-motor 8 controlled to be driven by speed feedback control along a position axis is detected and plotted in a foreign matter detection region (a region between a position 50 mm short of mold touch and a position of mold touch (a mold closing end position) in FIG. 2) during a mold closing process when there is no foreign matter between the dies. In this case, the measured torque value behaves as follows. That is, between a start position of the foreign matter detection region and a position where the aforementioned static balance (a position about 2 mm short of mold touch in FIG. 2) is taken before the mold touch, the absolute value of the measured torque value in the direction supporting the weight upward is reduced gradually toward 0 (zero). In the position where the static balance is taken before the mold touch, the measured torque value turns 0. Further, between the position where the static balance is taken before the mold touch and an end position of the foreign matter detection region (in the state of mold touch where the mold has been closed, and where the toggle link mechanism 10 has not been fully stretched), the absolute value of the measured torque value in a direction reverse to the direction supporting the weight upward is increased (the graph of FIG. 2 shows the behavior of the measured value going beyond 0 toward the negative side so that the absolute value thereof is increased relatively). According to the present invention, based on the knowledge of such behavior of the measured torque, it can be properly determined whether there is a foreign matter or not. Incidentally, the position where the static balance is taken before mold touch depends the torque characteristic of the toggle link mechanism, the weight supported by the toggle link mechanism, the thickness of each die (mold thickness), etc.

Therefore, according to the present invention, whether there is a foreign matter between the dies or not is determined as follows. In the state where it is guaranteed that there is no foreign matter between the dies, that is, for example, in a manual mold closing process operation after known die height adjustment is performed and before raw resin is supplied to the injection unit 7 (on this occasion, it can be guaranteed that there is no foreign matter between the dies, because the foreign matter is a residue of the resin staying after mold release after molding), a measured torque value is detected in the aforementioned foreign matter detection region of the mold opening/closing servo-motor controlled to be driven by speed feedback control along a position axis. Each measured torque value detected thus is plotted along the position axis (for example, a moving stroke of the movable die plate 4 in FIG. 2) so as to obtain a primitive standard torque characteristic curve. Next, if necessary, a smoothing process is applied to the primitive standard torque characteristic curve so as to create a standard torque characteristic curve in the foreign matter detection region with no foreign matter between the dies. The created standard torque characteristic curve is stored in advance.

Then, in continuous molding operation, in the foreign matter detection region during a mold closing process, a measured torque value of the mold opening/closing servo-motor 8 controlled to be driven by speed feedback control along the position axis is detected in each position. In each position, the measured torque value is compared with the standard torque characteristic curve with no foreign matter between the dies. Between a start position of the foreign matter detection region and a position of the foreign matter detection region where the torque value is zero in the standard torque characteristic curve (the aforementioned position where a static balance is taken before mold touch), it is concluded that there is a foreign matter between the dies when the measured torque value is lower in absolute value than the standard torque characteristic curve showing torque in a direction supporting the weight upward, by a predetermined value or more. Between the position of the foreign matter detection region where the torque value is zero in the standard torque characteristic curve and an end position of the foreign matter detection region, it is concluded that there is a foreign matter between the dies when the measured torque value is higher in absolute value than the standard torque characteristic curve showing torque in a direction reverse to the direction supporting the weight upward, by a predetermined value or more. This reason will be described below. Assume that there is a foreign matter between the dies. In this case, between the start position of the foreign matter detection region and the position where the torque value is zero in the standard torque characteristic curve, the foreign matter receives the gravity and acts to reduce the motor torque. Therefore, based on the aforementioned criterion, it is determined whether there is a foreign matter or not. When there is a foreign matter between the dies, between the position where the torque value is zero in the standard torque characteristic curve and the end position of the foreign matter detection region, the motor torque in the direction (mold closing direction) reverse to the direction supporting the weight upward increases to overcome the foreign matter. Therefore, the criterion is changed over to another one as described above, and it is determined by the other criterion whether there is a foreign matter or not. When it is concluded that there is a foreign matter between the dies, the operation is suspended, while an alarm is given to display the fact that the foreign matter has been detected.

Figure 3:
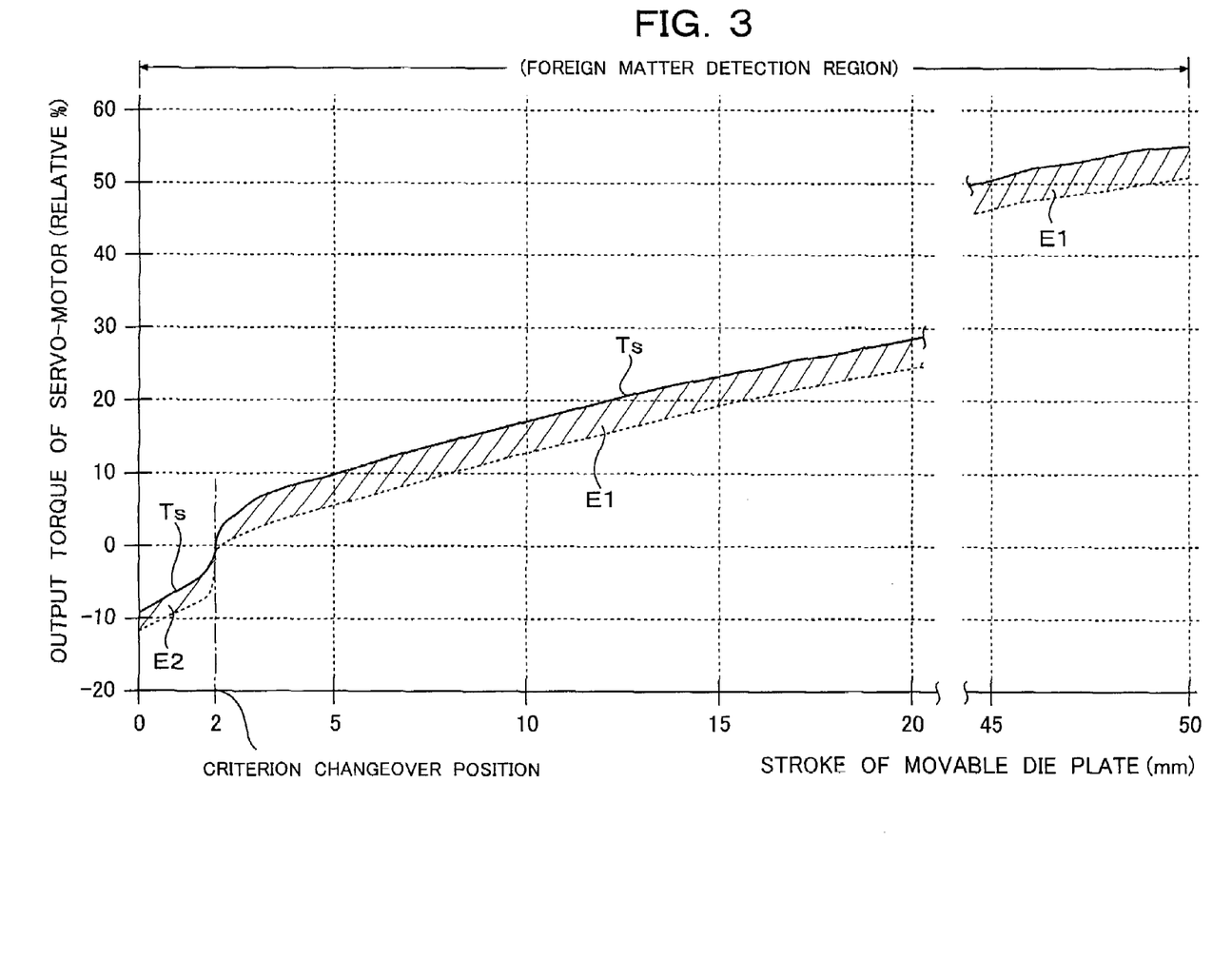
FIG. 3 is an explanatory diagram showing an example of a standard torque characteristic curve serving for determination of a foreign matter in a foreign matter detection region in the mold closing process in the vertical injection molding machine according to the embodiment of the present invention.

FIG. 3 is a diagram showing an example of the standard torque characteristic curve in the foreign matter detection region in the mold closing process in this embodiment. The standard torque characteristic curve is stored in advance. The ordinate in FIG. 3 designates the torque value of the mold opening/closing servo-motor 8 by relative %. The abscissa in FIG. 3 designates the stroke of the movable die plate 4 by mm. In FIG. 3, the region between a point 45 mm short of mold touch and a point 20 mm short of the mold touch in the abscissa is omitted. The reference sign Ts in FIG. 3 represents the standard torque characteristic curve. Between the start position of the foreign matter detection region (50 mm short of mold touch in FIG. 3) and the position of the foreign matter detection region (2 mm short of the mold touch in FIG. 3) where the torque value is zero in the standard torque characteristic curve Ts, it is concluded that there is a foreign matter between the dies when the measured torque value is lower in absolute value than an allowable range E1 set with respect to the standard torque characteristic curve Ts. Between the position of the foreign matter detection region where the torque value is zero in the standard torque characteristic curve Ts and the end position of the foreign matter detection region, it is concluded that there is a foreign matter between the dies when the measured torque value is higher in absolute value than an allowable range E2 set with respect to the standard torque characteristic curve Ts. Assume that there is a foreign matter of about 2 mm near the position where the torque value is zero in the standard torque characteristic curve Ts (the position 2 mm short of the mold touch in FIG. 3), that is, near the position where the criterion for determining whether there is a foreign matter or not is changed over. Even in this case, the measured torque value higher in absolute value than the allowable range E2 is inevitably detected in a position where mold closing should be further performed from the position 2 mm short of the mold touch. Thus, the foreign matter can be detected without problem.

Figure 4:
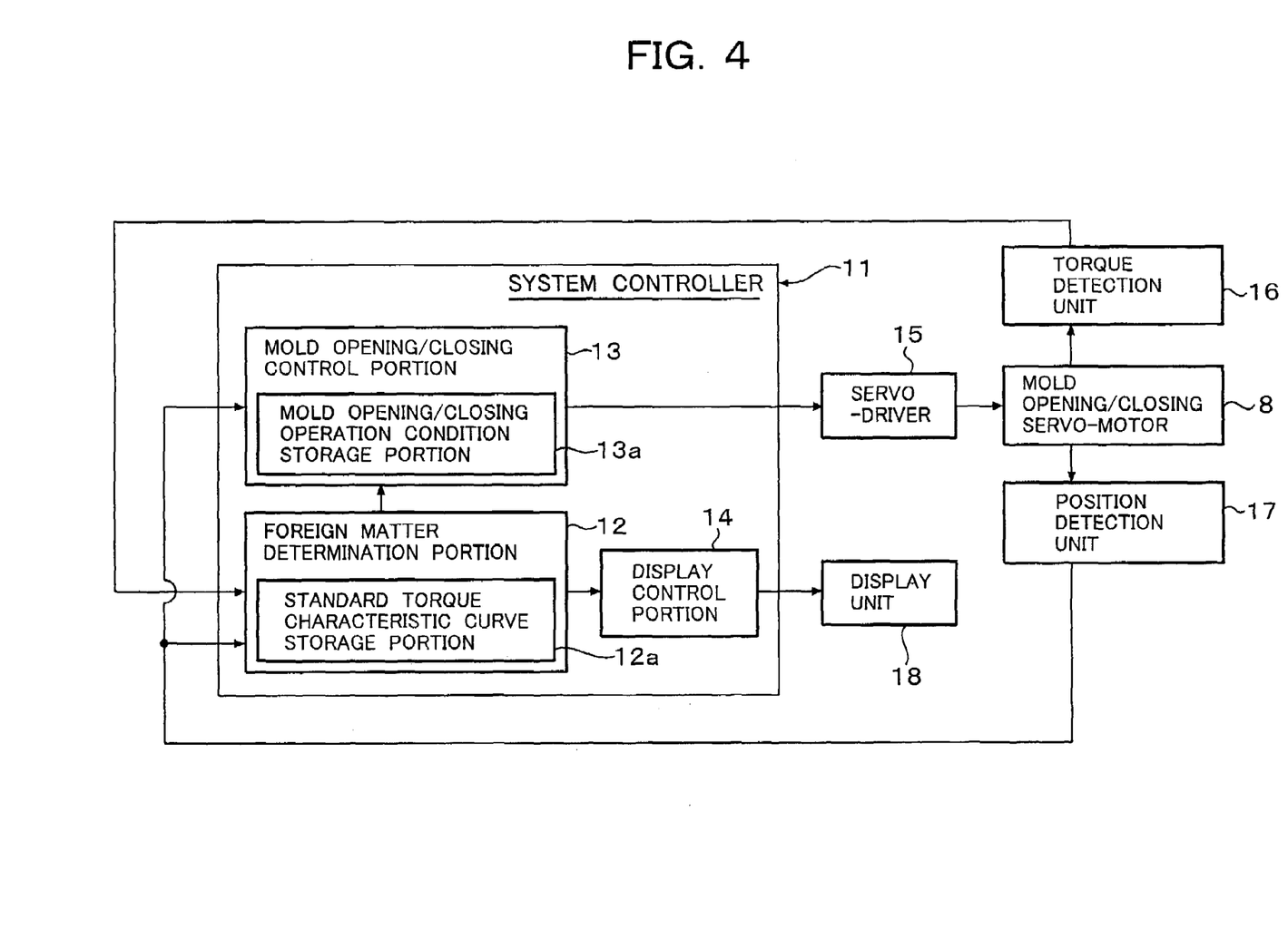
FIG. 4 is a block diagram chiefly showing the configuration about the determination of a foreign matter between dies in the vertical injection molding machine according to the embodiment of the present invention.

FIG. 4 is a block diagram chiefly showing the configuration about the determination of a foreign matter between the dies in the vertical injection molding machine according to this embodiment. In FIG. 4, the reference numeral 11 represents a system controller for administering the control of the vertical injection molding machine as a whole. Here, only parts involved in the gist of the present invention are depicted in the system controller 11. In the system controller 11, the reference numeral 12 represents a foreign matter determination portion having a standard torque characteristic curve storage portion 12a for rewritably storing the standard torque characteristic curve Ts; 13, a mold opening/closing control portion having a mold opening/closing operation condition storage portion 13a for rewritably storing mold closing/mold clamping operation conditions and mold opening operation conditions; and 14, a display control portion for generating image data to be displayed in response to a command or the like received from each part in the system controller 11. In addition, the reference numeral 15 represents a servo-amplifier for driving the mold opening/closing servo-motor 8 in accordance with a command from the mold opening/closing control portion 13; 16, a torque detection unit for detecting an actual driving current value of the servo-motor 8 and outputting a measured torque value; 17, a position detection unit for detecting the position of the cross head 10a based on the rotational quantity of the servo-motor 8, and outputting position information of the movable die plate 4 based on the detected position; and 18, a display unit for displaying the image data generated by the display control portion 14.

In the configuration shown in FIG. 4, during the mold closing process, the mold opening/closing control portion 13 controls the driving of the mold opening/closing servo-motor 8 by speed feedback control along a position axis through the servo amplifier 15 based on the mold closing operation conditions stored in the mold opening/closing operation condition storage portion 13a, or the output of the position detection unit 17. In the aforementioned foreign matter detection region in the mold closing process, the driving of the servo-motor 8 is controlled by speed feedback control at a low speed along the position axis. In the foreign matter detection region in the mold closing process, the foreign matter determination portion 12 recognizes the position of the movable die plate 4 based on the position information from the position detection unit 17, and compares the measured torque value in each position output from the torque detection unit 16 with the standard torque characteristic curve Ts in each position. Thus, the foreign matter determination portion 12 determines whether there is a foreign matter between the dies or not, in accordance with the criterion described above. Then, when the foreign matter determination portion 12 concludes that there is a foreign matter between the dies, the foreign matter determination portion 12 outputs an operation stop command to the mold opening/closing control portion 13 so as to urgently stop the mold closing operation. At the same time, the foreign matter determination portion 12 outputs a signal indicating the detection of the foreign matter to the display control portion 14 so as to make the display control portion 14 generate image data including a message for informing an operator of the fact that there is a foreign matter. Thus, the image data are displayed on the display unit 18.

What is claimed is:

1. A vertical injection molding machine comprising:
   a tail stock mounted with a mold opening/closing servo-motor;
   a movable die plate having a movable-side die disposed on a lower surface side thereof;
   a tie bar for tying said tail stock to said movable die plate;
   a fixed die plate disposed between said tail stock and said movable die plate and having a fixed-side die disposed on an upper surface side thereof;
   a ball screw mechanism for converting rotation of said mold opening/closing servo-motor into a rectilinear motion;
   a toggle link mechanism linked with an upper surface side of said tail stock and a lower surface side of said fixed die plate and driven to be stretched/folded by a rectilinear motion of a rectilinear movement member of said ball screw mechanism, said toggle link mechanism being driven to be stretched through said ball screw mechanism by said mold opening/closing servo-motor in a mold opening state so as to move down said tail stock to thereby move down said tie bar and said movable die plate together with said tail stock to thereby perform mold closing; and
   a foreign matter determination unit for comparing a measured torque value of said mold opening/closing servo-motor in a foreign matter detection region where said mold opening/closing servo-motor is subjected to speed feedback control along a position axis in a mold closing process, with a standard torque characteristic curve in a state where there is no foreign matter between said dies, so as to determine whether there is a foreign matter between said dies or not, said foreign matter determination unit changing over a criterion for determining whether there is a foreign matter or not, in the boundary of a torque value 0 in said standard torque characteristic curve.

2. A vertical injection molding machine according to claim 1, wherein:
   between a start position of said foreign matter detection region and a position of said foreign matter detection region where a torque value is zero in said standard torque characteristic curve, said foreign matter determination unit concludes that there is a foreign matter between said dies when said measured torque is lower in absolute value than said standard torque characteristic curve corresponding to torque in a direction supporting weight upward (torque in a mold opening direction) by a predetermined value or more; and
   between said position of said foreign matter detection region where a torque value is zero in said standard torque characteristic curve and an end position of said foreign matter detection region, said foreign matter determination unit concludes that there is a foreign matter between said dies when said measured torque is higher in absolute value than said standard torque characteristic curve corresponding to torque in a mold closing direction by a predetermined value or more.

3. A vertical injection molding machine according to claim 2, further comprising:
a storage unit in which said standard torque characteristic curve in said state where there is no foreign matter between said dies is stored based on a measured torque value measured in a mold closing process before an actual molding operation is started.

4. A vertical injection molding machine according to claim 2, further comprising:
an injection unit mounted and carried on an upper side of said movable die plate.

* * * * *